United States Patent
Tanaka (10) Patent No.: US 8,997,602 B2
(45) Date of Patent: Apr. 7, 2015

(54) POSITION ADJUSTABLE STEERING DEVICE

(71) Applicant: JTEKT Corporation, Osaka-shi, Osaka (JP)

(72) Inventor: Eiji Tanaka, Kitakatsuragi-gun (JP)

(73) Assignee: JTEKT Corporation, Osaka (JP)

( * ) Notice: Subject to any disclaimer, the term of this patent is extended or adjusted under 35 U.S.C. 154(b) by 172 days.

(21) Appl. No.: 13/713,440

(22) Filed: Dec. 13, 2012

(65) Prior Publication Data

US 2013/0160596 A1    Jun. 27, 2013

(30) Foreign Application Priority Data

Dec. 21, 2011 (JP) ................................ 2011-279883
Dec. 21, 2011 (JP) ................................ 2011-279884

(51) Int. Cl.
*B62D 1/184* (2006.01)
*B62D 1/185* (2006.01)
*B62D 1/189* (2006.01)

(52) U.S. Cl.
CPC ................ *B62D 1/184* (2013.01); *B62D 1/185* (2013.01); *B62D 1/189* (2013.01)

(58) Field of Classification Search
CPC ........ B62D 1/184; B62D 1/185; B62D 1/189; B62D 1/187; B62D 1/18; B62D 1/16
USPC .............................. 280/775, 779; 74/493, 492
See application file for complete search history.

(56) References Cited

U.S. PATENT DOCUMENTS

| 5,199,319 A * | 4/1993 | Fujiu ............................... 74/493 |
| 6,623,036 B2 * | 9/2003 | Yamamura et al. ........... 280/775 |
| 2006/0028010 A1 | 2/2006 | Yamada |
| 2008/0178701 A1 * | 7/2008 | Kim et al. ....................... 74/493 |
| 2013/0213174 A1 | 8/2013 | Suzuki et al. |

FOREIGN PATENT DOCUMENTS

| EP | 2 193 976 A2 | 6/2010 |
| JP | A-7-117685 | 5/1995 |
| JP | A-2009-286341 | 12/2009 |
| JP | A-2010-105662 | 5/2010 |
| JP | A-2010-189003 | 9/2010 |
| JP | B2-4609203 | 1/2011 |
| WO | WO 2005/037627 A1 | 4/2005 |
| WO | WO 2013/001965 A1 | 1/2013 |

OTHER PUBLICATIONS

Nov. 29, 2013 Extended Search Report issued in European Patent Application No. 12197579.1.

* cited by examiner

*Primary Examiner* — Keith Frisby
(74) *Attorney, Agent, or Firm* — Oliff PLC (57) ABSTRACT

When clamped side plates of an upper column bracket (movable bracket) are fastened via clamping side plates of an upper fixed bracket by a fastening shaft in response to a rotating operation of an operating lever, the brackets are locked with each other. A pressing mechanism that includes a pressing member moves in the axial direction of the fastening shaft in accordance with fastening by the fastening shaft, and presses a lower tube (inner tube) through an insertion hole formed in an upper tube (outer tube). The entirety of the axial force of the fastening shaft is used as a retaining force for retaining the posture of a steering column.

5 Claims, 8 Drawing Sheets

POSITION ADJUSTABLE STEERING DEVICE

INCORPORATION BY REFERENCE

The disclosure of Japanese Patent Applications No. 2011-279883 filed on Dec. 21, 2011 and No. 2011-279884 filed on Dec. 21, 2011 including the specification, drawings and abstract, is incorporated herein by reference in its entirety.

BACKGROUND OF THE INVENTION

1. Field of the Invention

The invention relates to a position adjustable steering device.

2. Description of Related Art

There is a steering column device in which a vehicle body attachment bracket is fastened to reduce the diameter of an outer column (outer tube) with an axial slit via a pair of clamp members, thereby clamping an inner column (inner tube) to the outer column (see, for example, Japanese Patent No. 4609203, Japanese Patent Application Publication No. 2010-105662 (JP 2010-105662 A), and Japanese Patent Application Publication No. 2010-189003 (JP 2010-189003 A)).

There is a steering column device in which a fixed side wall of a vehicle body fixed bracket (fixed bracket) is arranged at one side of a tubular steering column, and a tension plate, which selves as an elastic member and of which one end is fixed to a top plate of the fixed bracket, is arranged at the other side of the steering column (see, for example, Japanese Patent. Application Publication No. 2009-286341 (JP 2009-286141 A)).

In JP 2009-286341 A, a side plate of a fastening bracket fixed to an outer column (outer tube) of the steering column is fastened toward the fixed side wall by a fastening member. In this way, the brackets are locked. In addition, there is provided a coupling member that couples the tension plate to an inner column (inner tube). The coupling member passes through the outer column and the inner column, and a rib portion formed at one end of the coupling member is located inside the inner column. When the brackets are fastened by the fastening member, the rib portion of the coupling member pulled by the tension plate is pressed against the inner periphery of the inner column. As a result, the inner column is pressed against the outer column.

There is a steering device that prevents displacement in a telescopic direction by pressing the outer periphery of an inner column. The outer periphery of the inner column is pressed by pressing a column retaining member with a slit, using a plate portion of a tilt bracket (fixed bracket) fixed to a vehicle body, thereby reducing the inside diameter of the column retaining member (see, for example, WO05/037627).

There is a vehicle steering device in which a lock plate fixed to an upper bracket (fixed bracket) and a lock plate fixed to a distance bracket (movable bracket), to which a column jacket is fixed, respectively have teeth that mesh with each other, and axial movement of the column jacket is prevented by the meshing of the teeth (see, for example, Japanese Patent Application Publication No. 7-117685 (JP 7-117685 A).

In Japanese Patent No. 4609203, JP 2010-105662 A and JP 2010-189003 A, the inner column is retained by reducing the diameter of the outer column (outer tube). Therefore, there is a possibility that sufficient retaining force will not be obtained due to the influence of, for example, variations in dimensional accuracy.

In JP 2009-286341 A, the coupling member passes through the outer column and the inner column, and the rib portion formed at one end of the coupling member is located inside the inner column. Therefore, it is difficult to assemble the steering column device.

In WO05/037627, the inner column is retained by reducing the diameter of the column retaining member. Therefore, there is a possibility that sufficient retaining force will not be obtained due to the influence of, for example, variations in dimensional accuracy.

In JP 7-117685 A, the teeth of the both lock plates may be fastened to each other to be locked in a state where top portions of the teeth face each other. In this case, when the both lock plates are displaced by some impact and placed in a state where the teeth of one of the lock plates face tooth grooves of the other lock plate, the axial force of a fastening shaft is reduced, and the retainment of the posture of the steering column may be insufficient.

SUMMARY OF THE INVENTION

It is an object of the invention to provide a position adjustable steering device that reliably retains the posture of a steering column and that is easily assembled.

An aspect of the invention relates to a position adjustable steering device, including: a steering column that includes an outer tube and an inner tube that are fitted to each other so as to be relatively slidable in an axial direction of the steering column to make telescopic adjustment, and that support a steering shaft such that the steering shaft is rotatable; a fixed bracket that has a pair of clamping side plates, and that is fixed to a vehicle body; a movable bracket that has a pair of clamped side plates arranged along inner side faces of the respective clamping side plates, and that is fixed to the outer tube; a fastening mechanism that includes a fastening shaft that passes through the clamping side plates and the clamped side plates, and that achieves telescopic lock by fastening the clamped side plates with use of the fastening shaft via the clamping side plates in accordance with a rotating operation of an operating lever; an insertion hole that is formed in the outer tube; and a pressing mechanism that moves in an axial direction of the fastening shaft in accordance with fastening by the fastening shaft, and that has a pressing member that presses the inner tube through the insertion hole.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
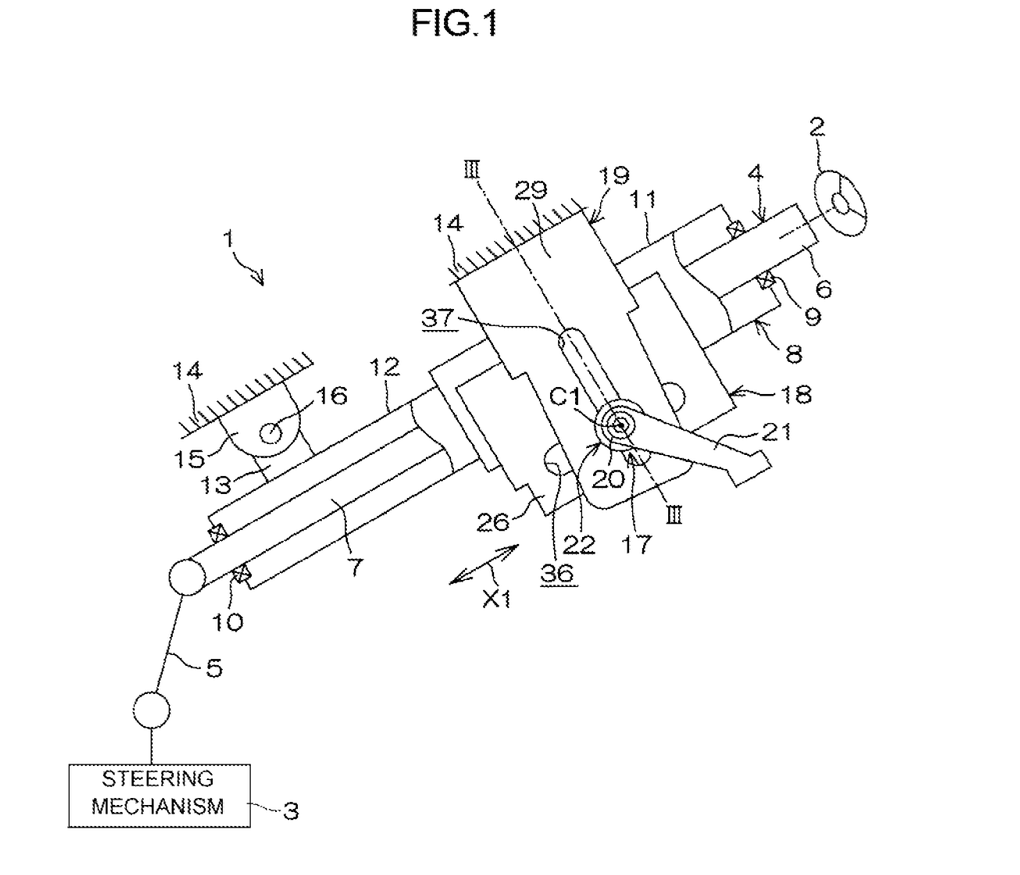
FIG. 1 is a schematic view of a position adjustable steering device according to an embodiment of the invention, as viewed from the left side of the position adjustable steering device.
Figure 2:
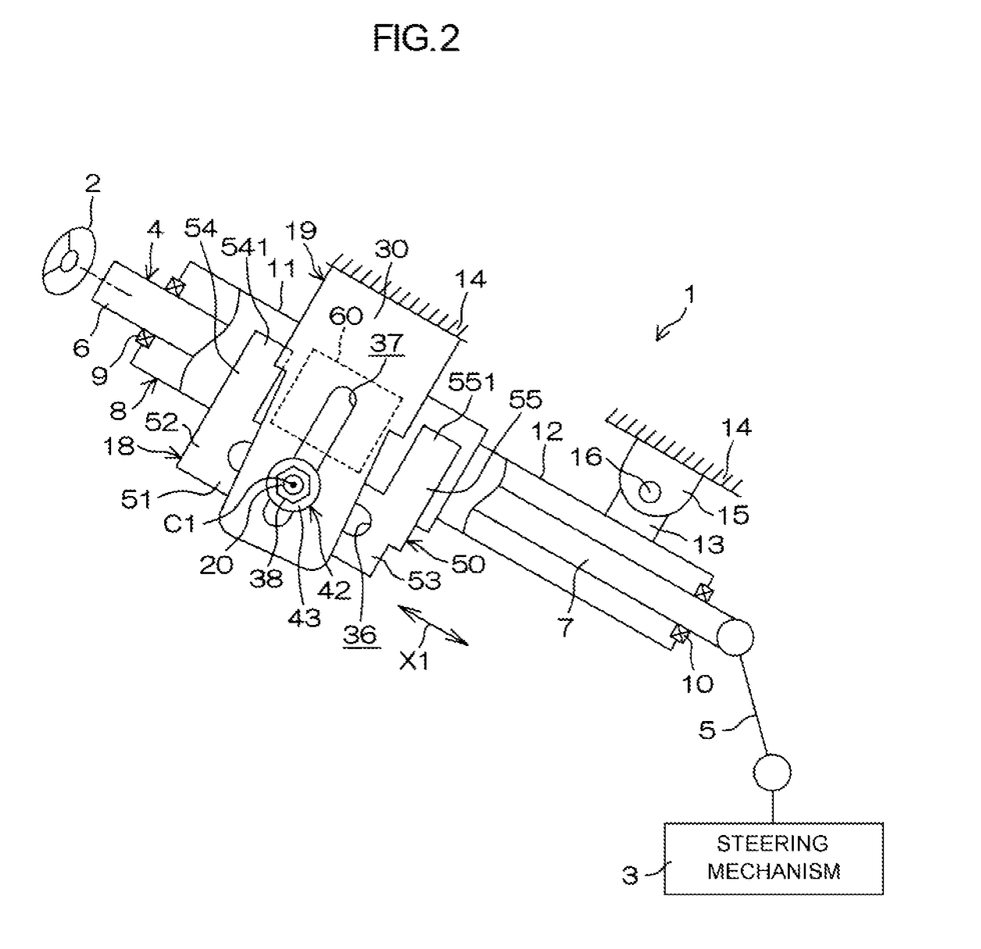
FIG. 2 is a schematic view of the position adjustable steering device according to the embodiment of the invention, as viewed from the right side of the position adjustable steering device.

Hereinafter, embodiment of the invention will be described with reference to the accompanying drawings. FIG. 1 and FIG. 2 are schematic views that show the schematic configuration of a position adjustable steering device according to an embodiment of the invention. FIG. 1 is a view of the position adjustable steering device 1 as viewed from the left side of position adjustable steering device 1. FIG. 2 is a view of the position adjustable steering device 1 as viewed from the right side of position adjustable steering device 1. As shown in FIG. 1, the position adjustable steering device 1 includes a steering member 2, such as a steering wheel, and a steering mechanism 3. The steering mechanism 3 steers steered wheels (not shown) in response to a steering operation of the steering member 2. For example, a rack and pinion mechanism is used as the steering mechanism 3.

The steering member 2 and the steering mechanism 3 are mechanically coupled to each other via a steering shaft 4, an intermediate shaft 5, and the like. The rotation of the steering member 2 is transmitted to the steering mechanism 3 via the steering shaft 4, the intermediate shaft 5, and the like. The rotation transmitted to the steering mechanism 3 is converted to an axial movement of a rack shaft (not shown). In this way, the steered wheels are steered.

The steering shaft 4 includes a tubular upper shaft 6 and a tubular lower shaft 7. The upper shaft 6 and the lower shaft 7 are relatively slidably fitted to each other through, for example, spline fitting or serration fitting. The steering member 2 is coupled to one end of the upper shaft 6. The steering shaft 4 is telescopic in its axial direction X1. The steering shaft 4 is passed through a tubular steering column 8, and is rotatably supported by the steering column 8 via a plurality of bearings 9, 10.

The steering column 8 includes an upper tube 11 and a lower tube 12. The upper tube 11 is an outer tube. The lower tube 12 is an inner tube. The upper tube 11 and the lower tube 12 are fitted to each other so as to be relatively slidable in the axial direction. Thus, the steering column 8 is telescopic in the axial direction, and telescopic adjustment (described later) is allowed. The upper tube 11 supports the upper shaft 6 via the bearing 9 such that the upper shaft 6 is rotatable. The upper tube 11 is coupled to the upper shaft 6 via the bearing 9 so as to be movable together with the upper shaft 6 in the axial direction X1 of the steering shaft 4.

A lower column bracket 13 is fixed to the outer periphery of the lower tube 12. The lower column bracket 13 is pivotably supported by a lower fixed bracket 15 via a tilt central shaft 16. The lower fixed bracket 15 is fixed to a vehicle body 14. The steering column 8 and the steering shaft 4 are pivotable about the tilt central shaft 16. By causing the steering shaft 4 and the steering column 8 to pivot about the tilt central shaft 16, it is possible to adjust the position of the steering member 2 in the height direction (so-called tilt adjustment). In addition, by extending or contracting the steering shaft 4 and the steering column 8 in the axial direction X1, it is possible to adjust the position of the steering member 2 in the height direction and the position of the steering member 2 in the axial direction (so-called telescopic adjustment).

The position adjustable steering device 1 includes a fastening mechanism 17 used to achieve tilt lock and telescopic lock to fix the position of the steering member 2 of which the height has been adjusted. Specifically, an upper column bracket 18, which may function as a movable bracket, is fixed to the upper tube 11 (outer tube). The upper column bracket 18 is coupled to an upper fixed bracket 19, which may function as a fixed bracket and which is fixed to the vehicle body 14 by the fastening mechanism 17. Thus, tilt lock and telescopic lock are achieved. As a result, the position of the steering column 8 is fixed with respect to the vehicle body 14, and therefore the position of the steeling member 2 is fixed.

As shown in FIG. 1 and FIG. 2, the fastening mechanism 17 includes a fastening shaft 20 and a cam mechanism 22. The fastening shaft 20 passes through a pair of clamping side plates 29, 30 of the upper fixed bracket 19 and a pair of clamped side plates 26, 50 of the upper column bracket 18. The cam mechanism 22 presses the clamping side plates 29, 30 against the clamped side plates 26, 50 in response to a rotating operation of an operating lever 21 that is rotatable about an axis C1 of the fastening shaft 20. The cam mechanism 22 is arranged along the clamping side plate 29 that faces the clamped side plate 26.

Figure 3:
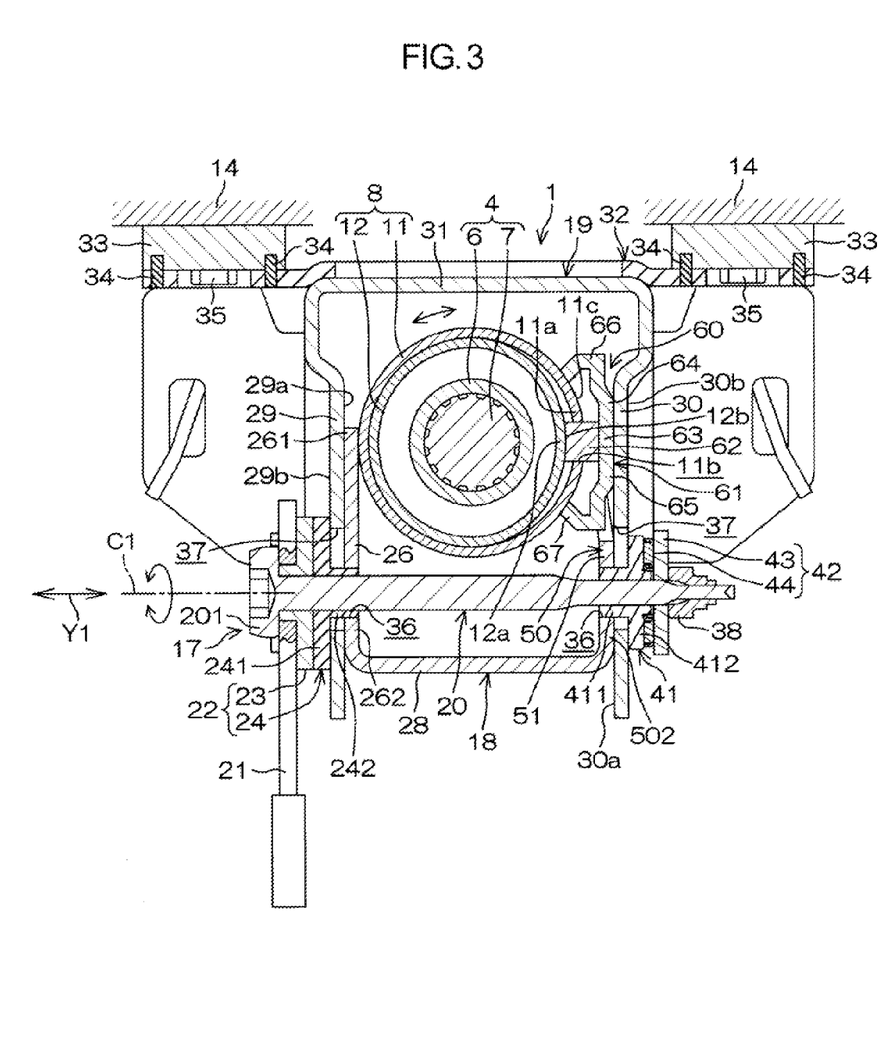
FIG. 3 is a sectional view that is taken along the line III-III in FIG. 1.

FIG. 3 is a diagrammatic sectional view of the position adjustable steering device 1, taken along the line III-III in FIG. 1. As shown in FIG. 3, the cam mechanism 22 includes a cam 23 and a cam follower 24. The rotation of the cam follower 24 is restricted by a vertically long hole 37 of the clamping side plate 29 of the upper fixed bracket 19. The cam 23 is rotatable together with the operating lever 21. The cam 23 and the cam follower 24 have cam protrusions (not shown) on their contact faces.

In accordance with the relative rotation between the cam 23 and the cam follower 24, the cam 23 moves the cam follower 24 in an axial direction Y1 of the fastening shaft 20. The cam 23 performs the function of pressing the clamping side plate 29 (30) of the upper fixed bracket 19 against the clamped side plate 26 (50) of the upper column bracket 18. Thus, the brackets 18, 19 are locked, and tilt lock and telescopic lock are achieved.

The upper column bracket 18, which may function as a movable bracket, is a groove-shaped member that opens upward. The upper column bracket IS includes the clamped side plates 26, 50 and a coupling plate 28. A first end portion 261 of the clamped side plate 26 is fixed to the outer periphery of the upper tube 11. Referring back to FIG. 2, the clamped side plate 50 facing the clamping side plate 30 includes a main portion 51 and a pair of vertical plate portions 54, 55 that extend toward the upper tube 11, from a pair of end portions 52, 53 of the main portion 51 in the longitudinal direction of the steeling column 8. The main portion 51 has a transversely long hole 36, through which the fastening shaft 20 is passed, and extends along the longitudinal direction of the steering column 8 (which corresponds to the axial direction X1 of the steering shaft 4). First end portions of the clamped side plate 50 (which correspond to end portions 541, 551 of the vertical plate portions 54, 55) are fixed to the outer periphery of the upper tube 11.

As shown in FIG. 3, the coupling plate 28 couples second end portions 262, 502 of the clamped side plates 26, 50 to each other. The upper fixed bracket 19 is a groove-shaped member, as a whole, which opens downward, and is formed so as to be bilaterally symmetric. That is, the upper fixed bracket 19 includes the clamping side plates 29, 30, a coupling plate 31 and a plate-like mounting stay 32. The clamping side plates 29, 30 face each other in the lateral direction. The coupling plate 31 couples upper ends of the clamping side plates 29, 30 to each other. The mounting stay 32 is fixed to the upper face of the coupling plate 31, and extends in the substantially lateral direction.

The clamped side plates 26, 50 of the upper column bracket 18 are arranged between the clamping side plates 29, 30 of the upper fixed bracket 19. The upper fixed bracket 19 is fixed to the vehicle body 14 via a pair of mounting members 33 coupled to the mounting stay 32. The mounting members 33 each are coupled to the mounting stay 32 by synthetic resin pins 34 that pass through the mounting stay 32 in the up-down direction. The synthetic resin pins 34 may break. The mounting members 33 are fixed to the vehicle body 14 with fixing bolts 35.

Outer side faces of the clamped side plates 26, 50 of the upper column bracket 18 are arranged along inner side faces 29a, 30a of the clamping side plates 29, 30 of the upper fixed bracket 19, respectively. The transversely long holes 36 for telescopic adjustment are formed in the clamped side plates 26, 50 of the upper column bracket 18. The transversely long holes 36 extend in a direction perpendicular to the sheet on which FIG. 3 is drawn (corresponding to the axial direction X1 in FIG. 1). The vertically long hole 37 for tilt adjustment is formed in each of the clamping side plates 29, 30 of the upper fixed bracket 19.

The fastening mechanism 17 includes the fastening shaft 20, a nut 38, the cam 23 and the cam follower 24. The fastening shaft 20 is passed through the vertically long holes 37 of the clamping side plates 29, 30 of the upper fixed bracket 19 and the transversely long holes 36 of the clamped side plates 26, 50 of the upper column bracket 18. The nut 38 is screwed to a threaded portion formed at one end portion of the fastening shaft 20. The cam 23 and the cam follower 24 are fitted to an outer peripheral portion near the other end portion of the fastening shaft 20. The cam 23 and the cam follower 24 constitute the cam mechanism 22.

A head 201 is formed at the other end portion of the fastening shaft 20. The head 201 of the fastening shaft 20 and the cam 23 are coupled to the operating lever 21 so as to be rotatable together with the operating lever 21. The cam follower 24 has a first portion 241 and a second portion 242. The first portion 241 of the cam follower 24 is arranged along an outer side face 29b of the clamping side plate 29 of the upper fixed bracket 19. The second portion 242 of the cam follower 24 is fitted into the vertically long hole 37 of the clamping side plate 29 of the upper fixed bracket 19 and the transversely long hole 36 of the clamped side plate 26 of the upper column bracket 18 so as to be movable in the directions in which the long holes 37, 36 extend. By forming a width across flat, or the like, at a portion at which the second portion 242 is fitted in the vertically long hole 37 of the clamping side plate 29, the rotation of the second portion 242 is restricted by the vertically long hole 37.

A first intervening member 41 and a second intervening member 42 are interposed between the nut 38 screwed to one end portion of the fastening shaft 20 and the clamping side plate 30 of the upper fixed bracket 19. The first intervening member 41 has a first portion 412 and a second portion 411. The first portion 412 of the first intervening member 41 is arranged along the outer side face 30b of the clamping side plate 30 of the upper fixed bracket 19.

The second portion 411 of the first intervening member 41 is fitted in the vertically long hole 37 of the clamping side plate 30 of the upper fixed bracket 19 and the transversely long hole 36 of the clamped side plate 50 of the upper column bracket 18 so as to be movable in the directions in which the long holes 37, 36 extend. By forming a width across flat, or the like, at a portion at which the second portion 411 is fitted in the vertically long hole 37 of the clamping side plate 30, the rotation of the second portion 411 is restricted by the vertically long hole 37.

The second intervening member 42 includes a thrust washer 43 and a thrust needle roller bearing 44. The thrust washer 43 is interposed between the first portion 412 of the first intervening member 41 and the nut 38. The needle roller bearing 44 is interposed between the thrust washer 43 and the first portion 412 of the first intervening member 41. Due to the function of the second intervening member 42 that includes the needle roller bearing 44, the nut 38 is able to smoothly rotate together with the fastening shaft 20.

Figure 4:
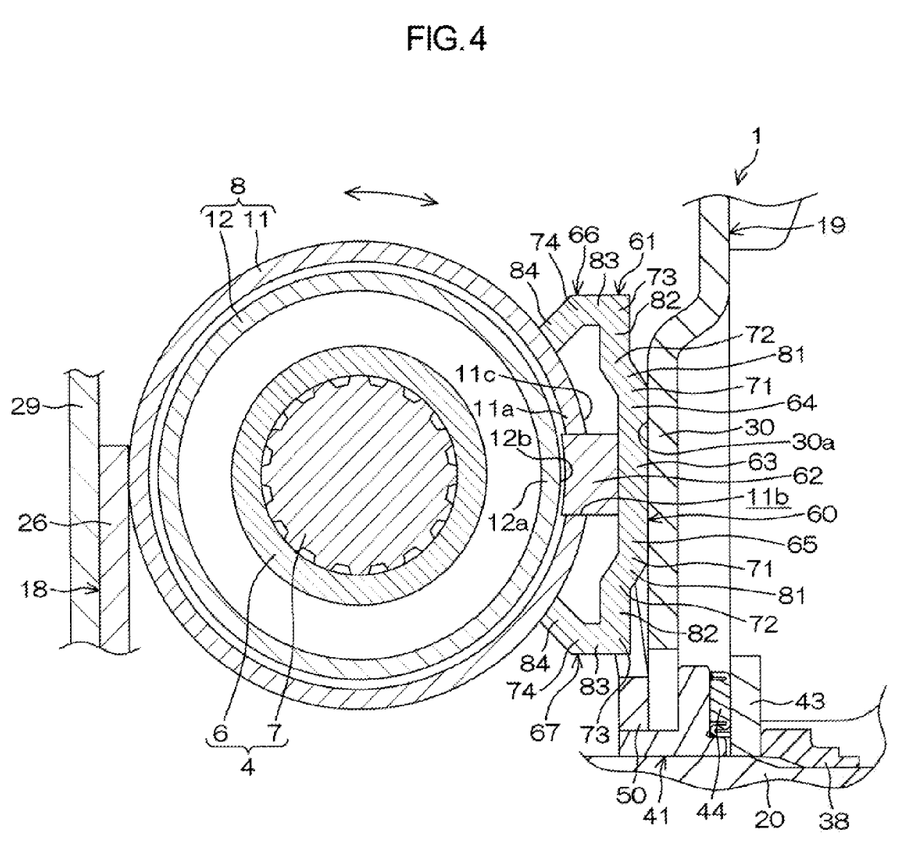
FIG. 4 is an enlarged sectional view of main portions of the position adjustable steering device according to the embodiment of the invention, including a pressing mechanism before pressing.

A feature of the present embodiment is that a pressing mechanism 60 is provided. The pressing mechanism 60 presses an outer face 12b of one side portion 12a of the lower tube 12 (inner tube) in a direction parallel to the fastening shaft 20 through an insertion hole 11b of one side portion 11a of the upper tube 11 (outer tube) when the pressing mechanism 60 is pressed by the clamping, side plate 30 at the time of fastening by the fastening mechanism 17. As shown in FIG. 3 and FIG. 4 that is an enlarged view, the pressing mechanism 60 is provided so as to project from an outer face 11c of the one side portion 11a of the upper tube 11. The pressing mechanism 60 includes an auxiliary movable bracket 61 and a pressing member 62. The auxiliary movable bracket 61 is in contact with the inner side face 30a of the damping side plate 30 and is elastically deformable. The pressing member 62 is fixed to the auxiliary movable bracket 61, and is able to press the outer face 12b of the one side portion 12a of the lower tube 12 through the insertion hole 11b of the upper tube 11. The pressing member 62 may be a resin member or may be a metal member made of, for example, sintered metal.

The auxiliary movable bracket 61 has a pressed side plate 63 and a pair of coupling portions 66, 67. The pressed side plate 63 is pressed by the inner side face 30a of the clamping side plate 30 in accordance with fastening by the fastening mechanism 17. The coupling portions 66, 67 couple end portions 64, 65 of the pressed side plate 63 to the outer tube 11, respectively. Each of the coupling portions 66, 67 has elastically deformable bending portions 71 to 74 (see FIG. 4 and FIG. 5). The pressing member 62 is fixed to the pressed side plate 63 of the auxiliary movable bracket 61, at a position between the end portions 64, 65.

As shown in FIG. 2, the pressing mechanism 60 is arranged between the vertical plate portions 54, 55 of the clamped side plate 50 in the longitudinal direction of the steering column 8 (the axial direction X1 of the steering shaft 4). As shown in FIG. 4, each of the coupling portions 66, 67 has a first coupling plate 81, a second coupling plate 82, a third coupling plate 83 and a fourth coupling plate 84. Each of the first coupling plates 81 is coupled to a corresponding one of the end portions 64, 65 of the pressed side plate 63 via the first bending portion 71 so as to be tilted with respect to the pressed side plate 63. Each of the second coupling plates 82 is coupled to a corresponding one of the first coupling plates 81 via the second bending portion 72 so as to be tilted with respect to the first coupling plate 81, and is parallel to the pressed side plate 63. Each of the third coupling plates 83 is coupled to a corresponding one of the second coupling plates 82 via the third bending portion 73 so as to be perpendicular to the second coupling plate 82. Each of the fourth coupling plates 84 is coupled to a corresponding one of the third coupling plates 83 via the fourth bending portion 74 so as to be tilted with respect to the third coupling plate 83. The fourth coupling plates 84 extend in the radial direction of the upper tube 11, and one ends of the fourth coupling plates 84 are fixed to the upper tube 11.

Figure 5:
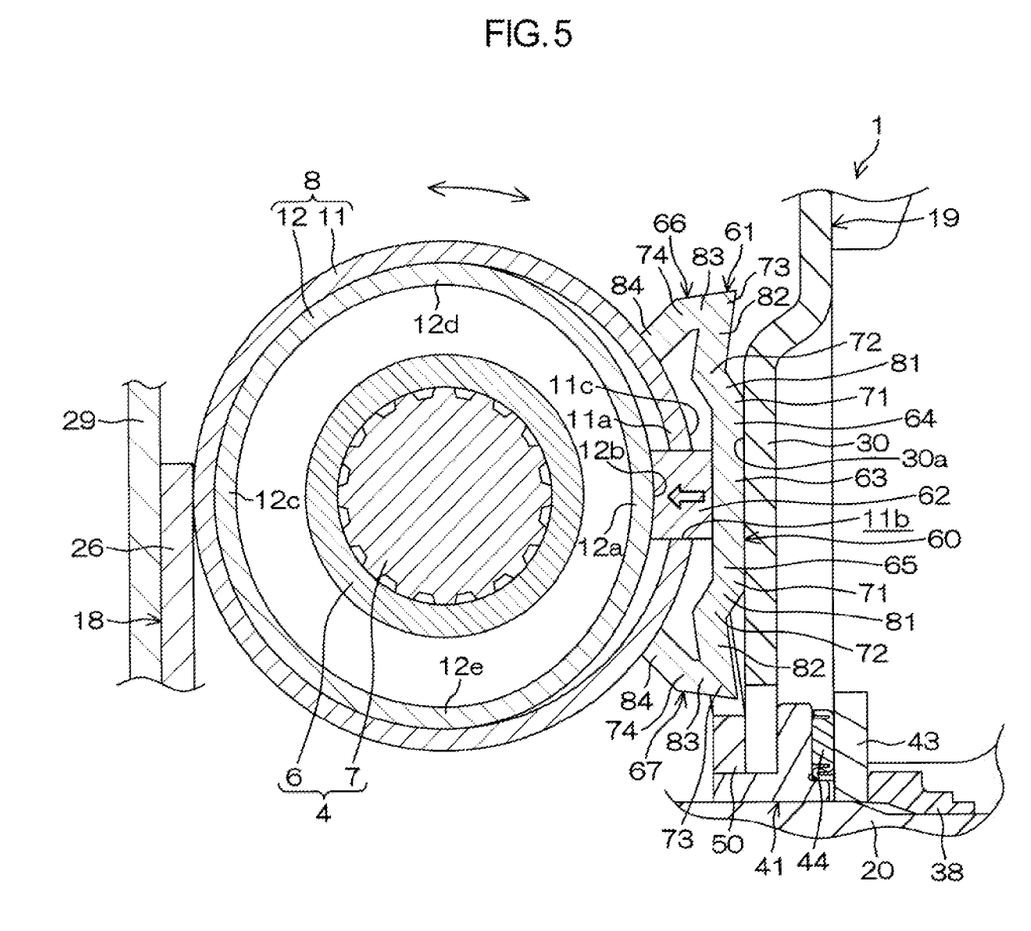
FIG. 5 is an enlarged sectional view of the main portions of the position adjustable steering device according to the embodiment of the invention, including the pressing mechanism after pressing.

When the pressed side plate 63 is pressed by the inner side face 30a of the clamping side plate 30 in accordance with fastening by the fastening mechanism 17, the bending portions 71 to 74 bend, the coupling portions 66, 67 are deflected, and parallel displacement of the pressed side plate 63 occurs, as shown in FIG. 5. As a result, the pressed side plate 63 presses the outer face 12b of the one side portion 12a of the lower tube 12 via the pressing member 62. The cross section of the lower tube 12, in which the outer face 12b of the one side portion 12a is pressed by the pressing member 62, elastically deforms from a circular shape shown in FIG. 4 to an oblong elliptical shape shown in FIG. 5.

According to the present embodiment, when the clamped side plates 26, 50 of the upper column bracket 18 (movable bracket) are fastened via the clamping side plates 29, 30 of the upper fixed bracket 19 by the fastening shaft 20 in response to a rotating operation of the operating lever 21, both of the brackets 18, 19 are locked with each other. In addition, the pressing mechanism 60 pressed by the clamping side plate 30 of the upper fixed bracket 19 presses the outer face 12b of the one side portion 12a of the lower tube 12 (inner tube) through the insertion hole 11b of the one side portion 11a of the upper tube 11 (outer tube), as shown in FIG. 5. As a result, the lower tube 12 is pressed against the upper tube 11 in a direction parallel to the fastening shaft 20, mainly, the outer face of the other side portion 12c of the lower tube 12 is pressed by the inner periphery of the upper tube 11, and both of the tubes 11, 12 are reliably locked.

It is possible to use the entirety of the axial force of the fastening shaft 20 as a retaining force for retaining the posture of the steering column 8. Therefore, it is possible to increase the retaining force even when the operating force of the operating lever 21 is substantially the same as that in related art. Consequently, in the event of a secondary collision of a vehicle, it is possible to suppress changes in the posture of the steering column 8 before the tubes 11, 12 contract. Accordingly, at the time of absorbing a shock, it is possible to perform a desired shock absorbing function by appropriately contracting the tubes 11, 12.

Furthermore, because the pressing mechanism 60 is configured such that the lower tube 12 (inner tube) is pressed from the outer side, the position adjustable steering device 1 is easier to assemble than a position adjustable steering device that is configured such that part of the pressing member is arranged inside the inner tube as described in JP 2009-286341 A. The cross section of the lower tube 12 in which the outer face 12b of the one side portion 12a is pressed by the pressing mechanism 60 elastically deforms into an oblong elliptical shape as shown in FIG. 5. Thus, it is possible to press a radially upper portion 12d and a radially lower portion 12e of the lower tube 12 against the inner periphery of the upper tube 11. Therefore, it is possible to further increase the retaining force for retaining the posture of the steering column 8 by improving coupling force for coupling the tubes 11, 12 to each other.

In accordance with fastening by the fastening mechanism 17, the auxiliary movable bracket 61 provided so as to protrude from the outer face 11c of the one side portion 11a of the upper tube 11 elastically deforms by being pressed by the clamping side plate 30. As a result, the pressing member 62 fixed to the auxiliary movable bracket 61 presses the outer face 12b of the one side portion 12a of the lower tube 12 through the insertion hole 11b of the upper tube 11. Because the pressing member 62 is fixed to the auxiliary movable bracket 61, it is possible to stably press the lower tube 12.

The pressed side plate 63 of the auxiliary movable bracket 61 is in surface contact with the inner side face 30a of the clamping side plate 30, and receives a fastening force of the fastening mechanism 17. Thus, it is possible to increase the coupling force for coupling the upper fixed bracket 19 to the upper column bracket 18 (movable bracket) and the auxiliary movable bracket 61 to each other. The pressed side plate 63 of the auxiliary movable bracket 61 is supported at both ends by the end portions 64 and 65, and the pressing member 62 is fixed to the pressed side plate 63, at a position between the end portions 64, 65. As a result, the pressing member 62 is stably supported. In addition, the bending portions 71 to 74 of each of the coupling portions 66, 67 adjacent to the end portions 64, 65 of the pressed side plate 63 elastically deform. Thus, it is possible to appropriately displace the pressing member 62, which is fixed to the pressed side plate 63 at a position between the end portions 64 and 65, in a direction parallel to the fastening shaft 20.

Each of the coupling portions 66, 67 has a plurality of (four, in the present embodiment) bending portions 71 to 74. With this configuration, it is possible to ensure a sufficient deflection amount even in the compact pressing mechanism 60. Therefore, it is possible to reliably press the lower tube 12 via the pressing member 62. The clamped side plate 50 that faces the clamping side plate 30 has the vertical plate portions 54, 55 that are apart from each other in the longitudinal direction of the steering column 8 (the axial direction X1 of the steering shaft 4), and the auxiliary movable bracket 61 is arranged between the vertical plate portions 54, 55. Therefore, it is possible to achieve size reduction.

At least part of the location of the fastening shaft 20 overlaps with the location of the pressing member 62 in the longitudinal direction of the steering column 8 the axial direction X1 of the steering shaft 4). Thus, the fastening force of the fastening shaft 20 is efficiently converted into the pressing force of the pressing member 62. In this way, it is possible to increase the coupling force for coupling the tubes 11, 12 to each other at the time of fastening by the fastening mechanism 17. Note that the invention is not limited to the above embodiment. At least one bending portion should be formed in each of the coupling portions 66, 67 of the auxiliary movable bracket 61 of the pressing mechanism 60. In the above-described embodiment, the nut 38, the fastening shaft 20 and the operating lever 21 are configured to rotate together with each other. Alternatively, there may be employed a configuration in which the operating lever 21 is rotated without rotating the fastening shaft 20 and the nut 38.

Figure 6:
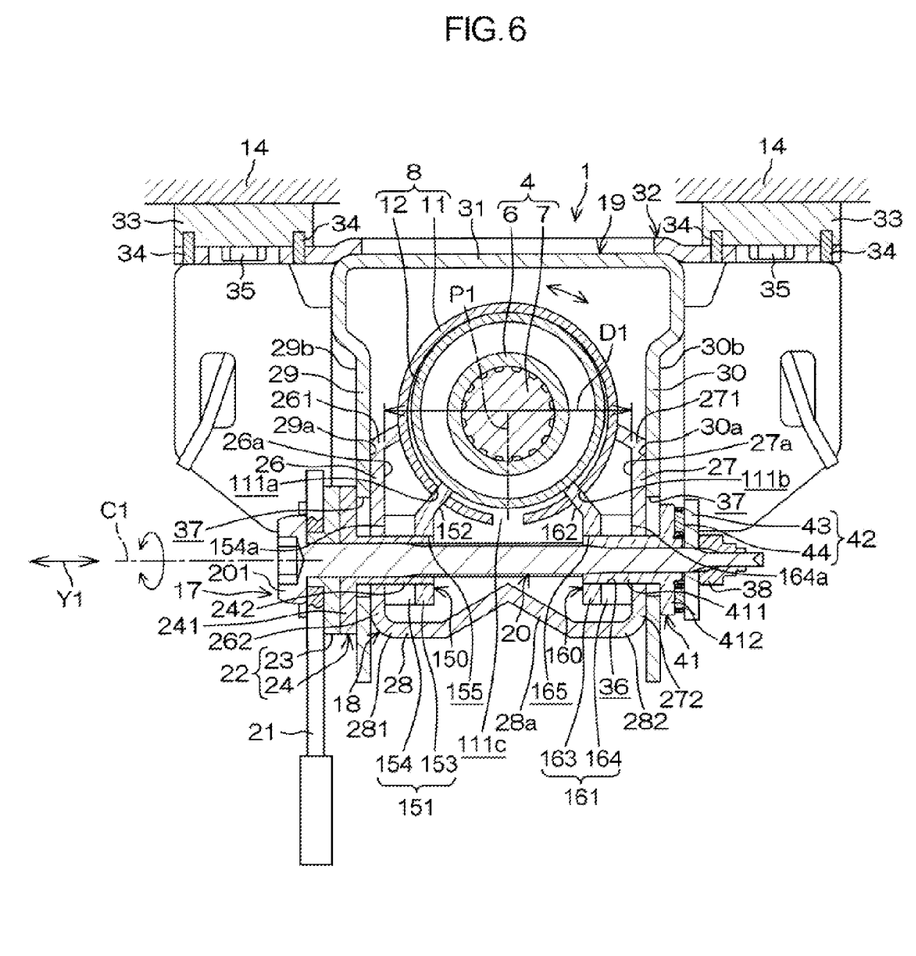
FIG. 6 is a sectional view that is taken along the line III-III in FIG. 1 according to an alternative embodiment of the invention.

FIG. 6 shows an alternative embodiment of the invention. FIG. 6 is a diagrammatic sectional view of the position adjustable steering device 1, taken along the line III-III in FIG. 1, according to the present embodiment. As shown in FIG. 6, the cam mechanism 22 of the fastening mechanism 17 includes the cam 23 and the cam follower 24. The cam 23 is rotatable together with the operating lever 21. The rotation of the cam follower 24 is restricted by the vertically long hole 37 of the clamping side plate 29 of the upper fixed bracket 19. The cam 23 and the cam follower 24 have cam protrusions (not shown) on their contact faces.

In accordance with the relative rotation between the cam 23 and the cam follower 24, the cam 23 moves the cam follower 24 in the axial direction. The cam 23 performs the function of pressing the clamping side plate 29 (30) of the upper fixed bracket 19 against the clamped side plate 26 (27) of the upper column bracket 18. Thus, the brackets 18, 19 are locked, and tilt lock and telescopic lock are achieved.

A feature of the present embodiment is as follows. There are provided pressing members that are able to press the lower tube 12 (inner tube) through insertion holes of the upper tube 11 (outer tube) as the pressing members move in the axial direction Y1 of the fastening shaft 20 at the time of fastening by the fastening mechanism 17. In this way, telescopic lock of the tubes 11, 12 is ensured. A first pressing member 150 and a second pressing member 160 are provided as the pressing members. Each of the pressing members 150, 160 is fixed to the upper column bracket 18 (movable bracket).

Figure 7:
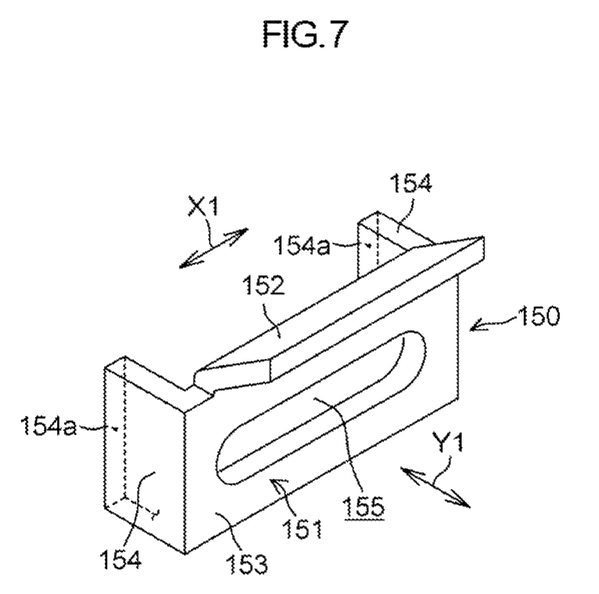
FIG. 7 is a perspective view of a pressing member shown in FIG. 6.

Specifically, the first pressing member 150 has a body portion 151 and a pressing piece 152. The body portion 151 is fixed along the inner side face 26a of the clamped side plate 26 of the upper column bracket 18. The pressing piece 152 extends from the body portion 151 so as to be tilted (obliquely upward) with respect to the body portion 151. As shown in FIG. 6 and FIG. 7, the body portion 151 has a web 153 and a pair of flanges 154, and forms a grooved shape. The web 153 extends parallel to the clamped side plate 26. The flanges 154 are provided at respective ends of the web 153. An end face 154a of each flange 154 is fixed to the inner side face 26a of the clamped side plate 26 by welding or pressure welding. A transversely long hole 155 is formed in the web 153 of the body portion 151. The transversely long hole 155 extends parallel to a telescopic direction (axial direction X1). A second portion 242 (described later) of the cam follower 24 is passed through the transversely long hole 155. The pressing piece 152 is formed of a long plate that is bent from an upper edge of the web 153 of the body portion 151 and is long in a direction parallel to the telescopic direction (axial direction X1).

Referring back to FIG. 6, the second pressing member 160 and the first pressing member 150 are formed of members having the same shape. That is, the first pressing member 150 and the second pressing member 160 are arranged in opposite orientations in the axial direction Y1 of the fastening shaft 20. The second pressing member 160 has a body portion 161 and a pressing piece 162. The body portion 161 is fixed along an inner side face 27a of the clamped side plate 27 of the upper column bracket 18. The pressing piece 162 extends from the body portion 161 so as to be tilted (obliquely upward) with respect to the body portion 161. A transversely long hole 165 is formed in a web 163 of the body portion 161. The second portion 411 of the first intervening member 41 is passed through the transversely long hole 165. An end face of each flange 164 of the body portion 161 is fixed to the inner side face 27a of the clamped side plate 27 by welding or pressure welding.

The pressing piece 152 of the first pressing member 150 is able to press the lower tube 12 through an insertion hole 111a formed in the upper tube 11. The pressing piece 162 of the second pressing member 160 is able to press the lower tube 12 through an insertion hole 111b formed in the upper tube 11. The pressing piece 152 of the first pressing member 150 and the pressing piece 162 of the second pressing member 160 are tilted in opposite directions with respect to a vertical plane P1.

In the present embodiment, a slit 111c is formed in the upper tube 11 at a position between the pressing pieces 152, 162. The slit 111c extends in the axial direction X1 (direction perpendicular to the sheet on which FIG. 6 is drawn). However, the slit 111c may be omitted. At the time of fastening by the fastening mechanism 17, the pressing members 150, 160 move so as to approach each other in the axial direction Y1 of the fastening shaft 20. Thus, the pressing pieces 152, 162 of the pressing members 150, 160 cooperatively push the lower tube 12 upward. As a result, the upper end of the outer periphery of the lower tube 12 is pressed against the inner periphery of the upper tube 11, and the tubes 12 are locked in the telescopic direction direction X1).

The upper column bracket 18, which may function as a movable bracket, is a groove-shaped member that opens upward, and is formed so as to be bilaterally symmetric. The upper column bracket 18 has the clamped side plates 26, 27 and the coupling plate 28. First end portions 261, 271 of the respective clamped side plates 26, 27 are fixed to the outer periphery of the upper tube 11. The coupling plate 28 couples second end portions 262, 272 of the clamped side plates 26, 27. That is, the second end portions 262, 272 of the clamped side plates 26, 27 are coupled to end portions 281, 282 of the coupling plate 28, respectively.

A flexible portion 28a is formed in a middle portion of the coupling plate 28. The flexible portion 28a is elastically deformable such that a distance D1 between the clamped side plates 26, 27 is reduced. The flexible portion 28a may be an inverted V-shaped portion as shown in FIG. 6 or may be a wavy portion (not shown). The upper fixed bracket 19 is, as a whole, a groove-shaped member that opens downward, and is formed so as to be bilaterally symmetric. That is, the upper fixed bracket 19 has the clamping side plates 29, 30, the coupling plate 31 and the plate-like mounting stay 32. The clamping side plates 29, 30 face each other in the lateral direction. The coupling plate 31 couples upper ends of the clamping side plates 29, 30. The mounting stay 32 is fixed to the upper face of the coupling plate 31, and extends in the substantially lateral direction.

The clamped side plates 26, 27 of the upper column bracket 18 are arranged between the clamping side plates 29, 30 of the upper fixed bracket 19. The upper fixed bracket 19 is fixed to the vehicle body 14 via the mounting members 33 coupled to the mounting stay 32. The mounting members 33 each are coupled to the mounting stay 32 with the synthetic resin pins 34 that pass through the mounting stay 32 in the up-down direction. The synthetic resin pins 34 may break. The mounting members 33 each are fixed to the vehicle body 14 with the fixing bolt 35.

The outer side faces of the corresponding clamped side plates 26, 27 of the upper column bracket 18 are arranged along inner side faces 29a, 30a of the clamping side plates 29, 30 of the upper fixed bracket 19. The transversely long holes 36 for telescopic adjustment are formed in the clamped side plates 26, 27 of the upper column bracket 18. The transversely long holes 36 extend in a direction perpendicular to the sheet on which FIG. 6 is drawn (corresponding to the axial direction X1 in FIG. 1). The vertically long hole 37 for tilt adjustment is formed in each of the clamping side plates 29, 30 of the upper fixed bracket 19.

The fastening mechanism 17 includes the fastening shaft 20, a nut 38, the cam 23 and the cam follower 24. The fastening shaft 20 is passed through the vertically long holes 37 of the clamping side plates 29, 30 of the upper fixed bracket 19 and the transversely long holes 36 of the clamped side plates 26, 27 of the upper column bracket 18. The nut 38 is screwed to a threaded portion formed at one end portion of the fastening shaft 20. The cam 23 and the cam follower 24 are fitted to an outer peripheral portion near the other end portion of the fastening shaft 20. The cam 23 and the cam follower 24 constitute the cam mechanism 22.

The head 201 is formed at the other end portion of the fastening shaft 20. The head 201 of the fastening shaft 20 and the cam 23 are coupled to the operating lever 21 so as to be rotatable together with the operating lever 21. That is, by operating the operating lever 21, the pressing members 150, 160 push up the lower tube 12 (inner tube) with the use of the pressing pieces 152, 162. Thus, the lower tube 12 is radially pressed against the upper tube 11 (outer tube), and a backlash of the lower tube 12 in the radial direction with respect to the upper tube 11 is suppressed.

The cam follower 24 has the first portion 241 and the second portion 242. The first portion 241 of the cam follower 24 is arranged along the outer side face 29b of the clamping side plate 29 of the upper fixed bracket 19. The second portion 242 of the cam follower 24 is fitted into the vertically long hole 37 of the clamping side plate 29 of the upper fixed bracket 19 and the transversely long hole 36 of the clamped side plate 26 of the upper column bracket 18 so as to be movable in the directions in which the long holes 37, 36 extend. By forming a width across flat, or the like, at a portion at which the second portion 242 is fitted in the vertically long hole 37 of the clamping side plate 29, the rotation of the second portion 242 is restricted by the vertically long hole 37.

The first intervening member 41 and the second intervening member 42 are interposed between the nut 38 screwed to one end portion of the fastening shaft 20 and the clamping side plate 30 of the upper fixed bracket 19. The first intervening member 41 has the first portion 412 and the second portion 411. The first portion 412 of the first intervening member 41 is arranged along the outer side face 30b of the clamping side plate 30 of the upper fixed bracket 19.

The second portion 411 of the first intervening member 41 is fitted in the vertically long hole 37 of the clamping side plate 30 of the upper fixed bracket 19 and the transversely long hole 36 of the clamped side plate 27 of the upper column bracket 18 so as to be movable in the directions in which the long holes 37, 36 extend. By forming a width across flat, or the like, at a portion at which the second portion 411 is fitted in the vertically long hole 37 of the clamping side plate 30, the rotation of the second portion 411 is restricted by the vertically long hole 37.

The second intervening member 42 includes the thrust washer 43 and the thrust needle roller bearing 44. The thrust washer 43 is interposed between the first portion 412 of the first intervening member 41 and the nut 38. The needle roller bearing 44 is interposed between the thrust washer 43 and the first portion 412 of the first intervening member 41. Due to the function of the second intervening member 42 that includes the needle roller bearing 44, the nut 38 is able to smoothly rotate together with the fastening shaft 70.

According to the present embodiment, the clamped side plates 26, 27 of the upper column bracket 18 are fastened via the clamping side plates 29, 30 of the upper fixed bracket 19 by the fastening shaft 20 in response of a rotating operation of the operating lever 21. Thus, both of the brackets 18, 19 are locked. In addition, at the time of fastening by the fastening shaft 20, the distance D1 between the clamped side plates 26, 27 of the upper column bracket 18 is reduced. Accordingly, the pressing members 150, 160 move in the axial direction Y1 of the fastening shaft 20, and the pressing pieces 152, 162 of the pressing members 150, 160 press the lower tube 12 (inner tube) through the insertion holes 111a, 111b of the upper tube 11 (outer tube), respectively. As a result, the lower tube 12 is pushed against the upper tube 11, and the tubes 11, 12 are reliably locked.

It is possible to use the entirety of the axial force of the fastening shaft 20 as a retaining force for retaining the posture of the steeling column 8. Therefore, it is possible to increase the retaining force even when the operating force of the operating lever 21 is substantially the same as that in related art. Consequently, in the event of a secondary collision of a vehicle, it is possible to suppress changes in the posture of the steering column 8 before the tubes 11, 12 contract. Accordingly, at the time of absorbing a shock, it is possible to perform a desired shock absorbing function by appropriately contracting the tubes 11, 12.

The pressing pieces 152, 162 of the pressing members 150, 160 are tilted in opposite directions with respect to the vertical plane P1. Therefore, at the time of fastening by the fastening mechanism 17, the pressing pieces 152, 162, for example, cooperatively push up the lower tube 12 to press the lower tube 12 against the upper tube 11. In this way, it is possible to stably retain the posture of the steering column 8. In addition, at the time of fastening by the fastening mechanism 17, the flexible portion 28a of the coupling plate 28 that couples the clamped side plates 26, 27 of the upper column bracket 18 to each other elastically deforms. In this way, the distance D1 between the clamped side plates 26, 27 is reduced. Thus, it is possible to reliably place the tubes 11, 12 in the locked state by ensuring sufficient displacements of the pressing members 150, 160 in the axial direction of the fastening shaft 20.

In related art in which the lower tube is pushed up by the cam provided on the outer periphery of the sleeve that rotates together with the fastening shaft, an region of the lower tube in the axial direction, which the cam contacts, is short. In contrast to this, in the present embodiment in which the pressing members 150, 160 are moved in the axial direction Y1 of the fastening shaft 20, it is possible to extend the region of the lower tube 11 in the axial direction X1, which the pressing piece 152 contacts, by extending the pressing piece 152 in the axial direction X1 of the lower tube 12. In terms of this point as well, it is possible to reliably place the tubes 11, 12 in the locked state. Note that, in the present embodiment, the slit 111c of the upper tube 11 may be omitted.

Figure 8:
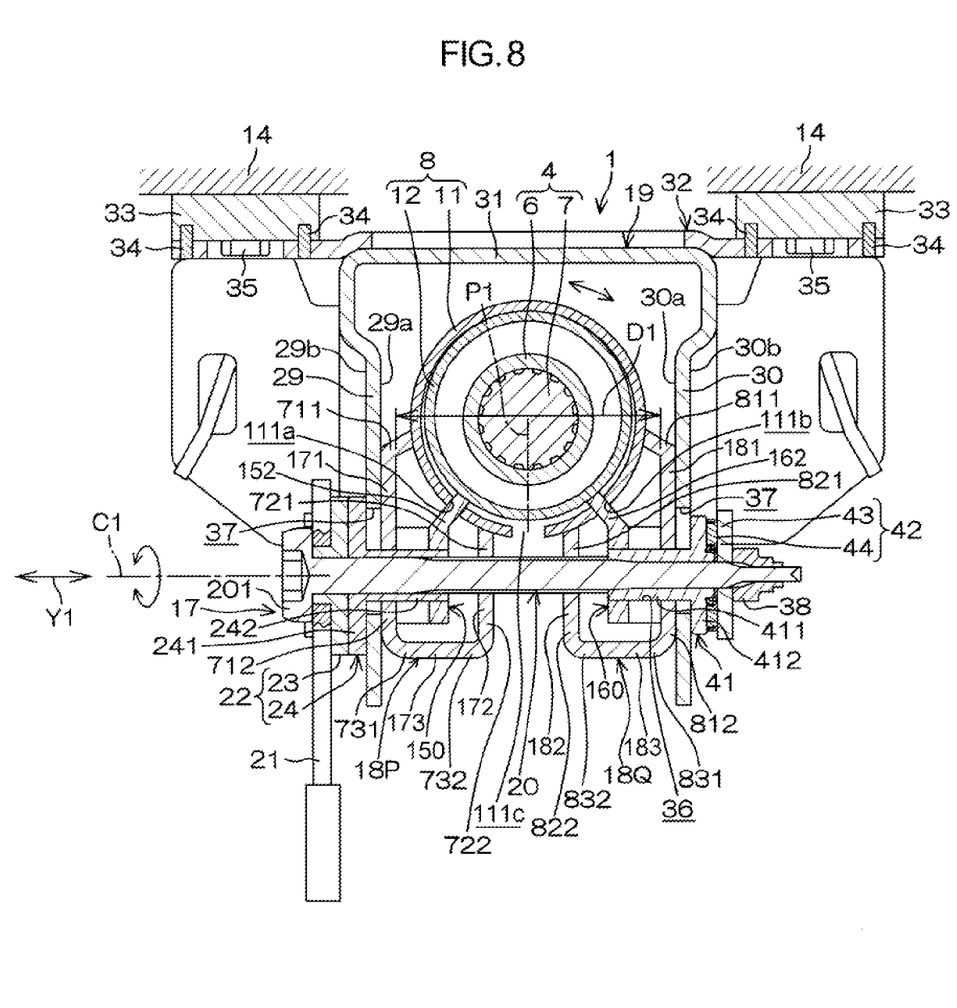
FIG. 8 is a schematic view of a position adjustable steering device according to an alternative embodiment of the invention.

Next, FIG. 8 shows an alternative embodiment of the invention. As shown in FIG. 8, the present embodiment mainly differs from the embodiment shown in FIG. 6 in the following point. In the embodiment shown in FIG. 6, the single upper column bracket 18 is used as the movable bracket; whereas, in the present embodiment, a first upper column bracket 18P (first movable bracket) and a second upper column bracket 18Q (second movable bracket) are provided as the movable brackets.

The first upper column bracket 18P has a first side plate 171, a second side plate 172 and a coupling plate 173. The first side plate 171 is a clamped side plate that is arranged along the inner side face 29a of the clamping side plate 29 of the upper fixed bracket 19. The second side plate 172 faces the inner side face of the first side plate 171. The coupling plate 173 couples the first side plate 171 and the second side plate 172 to each other. The first side plate 171 has a first end portion 711 and a second end portion 712, and the second side plate 172 has a first end portion 721 and a second end portion 722. The first end portions 711, 721 are fixed to the upper tube 11. The second end portions 712, 7122 are coupled to end portions 731, 732 of the coupling plate 173, respectively. The first pressing member 150 is fixed to the inner side face of the first side plate 171 that may function as a clamped side plate.

The second upper column bracket 18Q has a first side plate 181, a second side plate 182 and a coupling plate 183. The first side plate 181 is a clamped side plate that is arranged along the inner side face 30a of the clamping side plate 30 of the upper fixed bracket 19. The second side plate 182 faces the inner side face of the first side plate 181. The coupling plate 183 couples the first side plate 181 and the second side plate 182 to each other. The first side plate 181 has a first end portion 811 and a second end portion 812, and the second side plate 182 has a first end portion 821 and a second end portion 822. The first end portions 811, 821 are fixed to the outer periphery of the upper tube 11. The second end portions 812, 822 are coupled to end portions 831, 832 of the coupling plate 183, respectively. The second pressing member 160 is fixed to the inner side face of the first side plate 181 that may function as a clamped side plate.

The slit 111c is formed in the upper tube 11. The slit 111c extends in the axial direction X1. The first end portions 711, 721 of the first side plate 171 and second side plate 172 of the first upper column bracket 18P and the first end portions 811, 821 of the first side plate 181 and second side plate 182 of the second upper column bracket 18Q are fixed to the outer periphery of the upper tube 11 on respective sides of the slit 111c.

Among the components in the embodiment shown in FIG. 8, the same components as those in the embodiment shown in FIG. 6 are denoted by the same reference numerals as those in FIG. 6. According to the present embodiment, each of the first upper column bracket 18P and the second upper column bracket 18Q, which may function as a movable brackets, is fixed to the upper tube 11 at two portions. Specifically, the first upper column bracket 18P is fixed to the upper tube 11 at two portions, that is, the first end portion 711 of the first side plate 171 and the first end portion 721 of the second side plate 172. The second upper column bracket 18Q is fixed to the upper tube 11 at two portions, that is, the first end portion 811 of the first side plate 181 and the first end portion 821 of the second side plate 182. Thus, it is possible to suppress concentration of stress at each of the points of coupling between the first upper column bracket 18P and the second upper column bracket 18Q, and the upper tube 11.

At the time of fastening by the fastening mechanism 17, the diameter of the upper tube 11 with the slit 111c is reduced. Therefore, it is possible to bring the upper column brackets 18P, 18Q, which are arranged on respective sides of the slit 111c, close to each other in the axial direction Y1 of the fastening shaft 20. As a result, it is possible to reliably place the tubes 11, 12 in the locked state by ensuring sufficient displacements of the pressing members 150, 160 in the axial direction Y1 of the fastening shaft 20.

In the above-described embodiment, the nut 38, the fastening shaft 20 and the operating lever 21 are configured to rotate together with each other. Alternatively, there may be employed a configuration in winch the operating lever 21 is rotated without rotating the fastening shaft 20 and the nut 38. The invention is not limited to the above-described embodiments, and various modifications may be made within the scope of the appended claims.

What is claimed is:

1. A position adjustable steering device, comprising:
a steering column that includes an outer tube and an inner tube that are fitted to each other so as to be relatively slidable in an axial direction of the steering column to make telescopic adjustment, and that support a steering shaft such that the steering shaft is rotatable;
a fixed bracket that has a pair of clamping side plates, and that is fixed to a vehicle body;
a movable bracket that has a pair of clamped side plates arranged along inner side faces of the respective clamping side plates, and that is fixed to the outer tube;
a fastening mechanism that includes a fastening shaft that passes through the clamping side plates and the clamped side plates, and that achieves telescopic lock by fastening the clamped side plates with use of the fastening shaft via the clamping side plates in accordance with a rotating operation of an operating lever;
an insertion hole that is formed in one side portion of the outer tube; and
a pressing mechanism that moves in an axial direction of the fastening shaft in accordance with fastening by the fastening shaft, and that has a pressing member that presses the inner tube through the insertion hole, wherein:
the pressing mechanism presses an outer face of one side portion of the inner tube through the insertion hole in a direction parallel to the fastening shaft by being pressed by a corresponding one of the clamping side plates in accordance with fastening by the fastening mechanism,
a cross section of the inner tube pressed by the pressing mechanism is elastically deformed into an oblong elliptical shape, and
the pressing mechanism includes:
an elastically deformable auxiliary movable bracket that is provided so as to protrude from an outer face of the one side portion of the outer tube, and that is in contact with the inner side face of the corresponding one of the clamping side plates; and
a pressing member that is fixed to the auxiliary movable bracket, and that is able to press the outer face of the one side portion of the inner tube through the insertion hole of the outer tube.

2. The position adjustable steering device according to claim 1, wherein:
the auxiliary movable bracket includes
a pressed side plate that is pressed by the inner side face of the corresponding one of the clamping side plates in accordance with fastening by the fastening mechanism, and
a pair of coupling portions that respectively couple a pair of end portions of the pressed side plate to the outer tube;
each of the coupling portions has an elastically deformable bending portion; and
the pressing member is fixed to the pressed side plate of the auxiliary movable bracket, at a position between the end portions of the pressed side plate.

3. The position adjustable steering device according to claim 2, wherein
a plurality of bending portions are formed as the bending portion of each of the coupling portions.

4. The position adjustable steering device according to claim 3, wherein:
the clamped side plate that faces the corresponding one of the clamping side plates includes a pair of vertical plate portions that are apart from each other in an axial direction of the steering shaft; and
the auxiliary movable bracket is arranged between the vertical plate portions in the axial direction of the steering shaft.

5. The position adjustable steering device according to claim 4, wherein
at least part of a location of the fastening shaft overlaps with a location of the pressing member in the axial direction of the steering shaft.

* * * * *